March 28, 1939.  H. BRESSER  2,151,735
COLORED PICTURE PROJECTOR
Filed Oct. 15, 1936   2 Sheets-Sheet 1
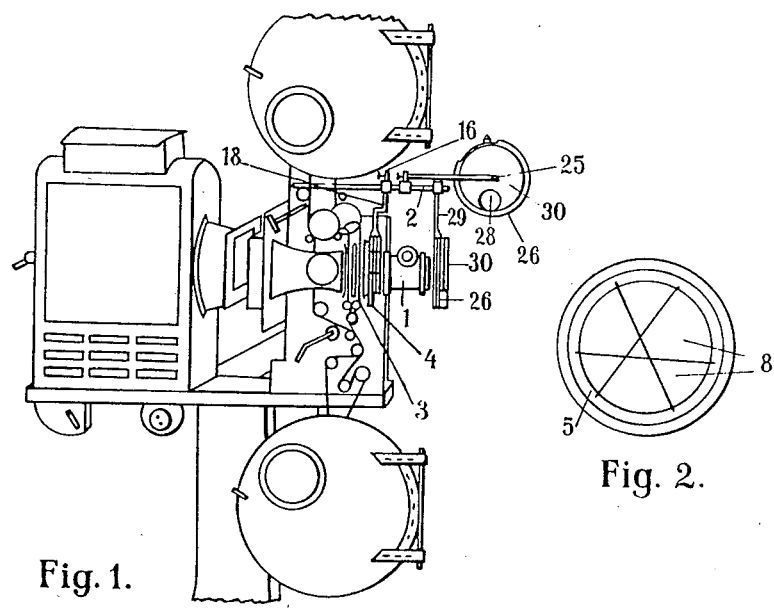
Fig. 1.
Fig. 2.
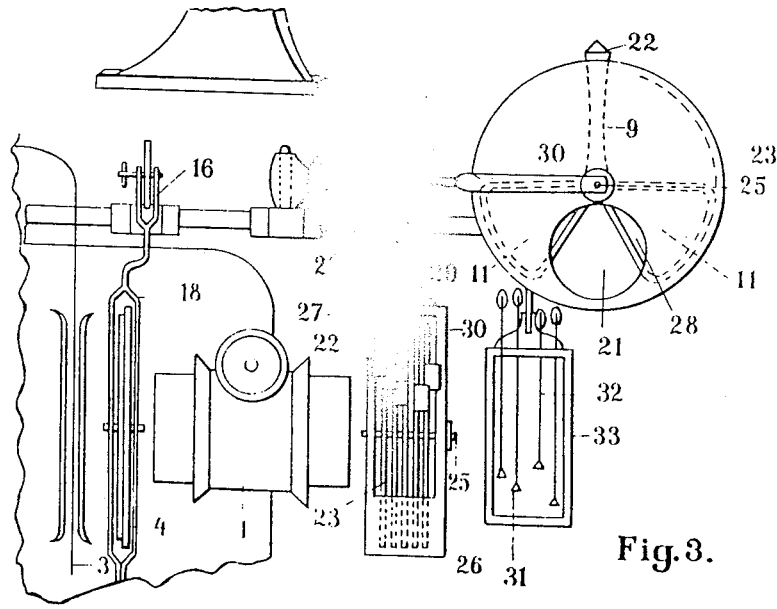
Fig. 3.
INVENTOR
Heinrich Bresser March 28, 1939.  H. BRESSER  2,151,735
COLORED PICTURE PROJECTOR
Filed Oct. 15, 1936  2 Sheets-Sheet 2
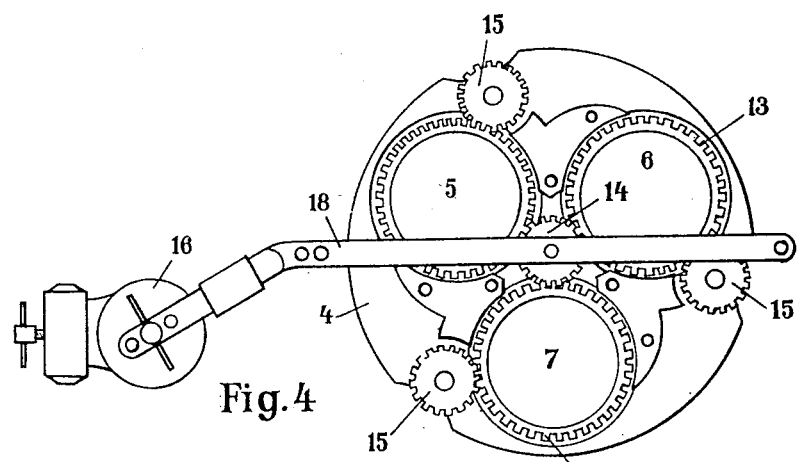
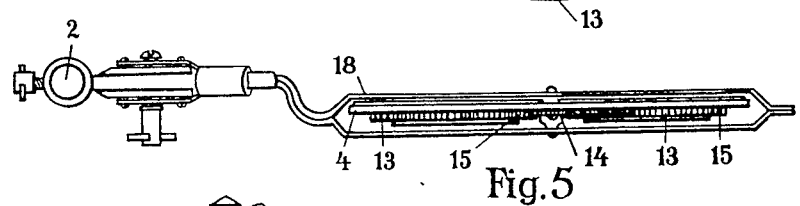
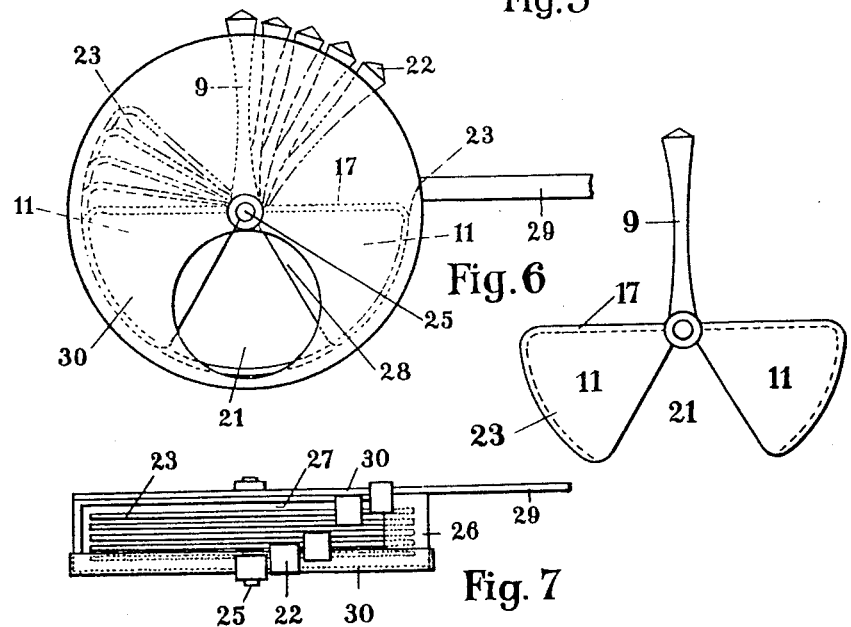
INVENTOR
Heinrich Bresser Patented Mar. 28, 1939

2,151,735

UNITED STATES PATENT OFFICE 2,151,735

COLORED PICTURE PROJECTOR

Heinrich Bresser, Cologne-Mulheim, Germany, assignor to Maria Bresser, Cologne-Mulheim, Germany Application October 15, 1936, Serial No. 105,696
In Germany June 24, 1935

2 Claims. (Cl. 88—16.4)

This invention relates to a filtering arrangement for the colored projection of positive black and white films using a known kinematographic projection apparatus.

With the known arrangements of the type any desired filter can be brought into the path of rays to transmit colors, but toning of any desired individual portion of the picture could not be obtained. It was for instance not possible to shade off color in a sea landscape the third at the top as blue sky, the middle third as green forest with yellow sand and the third at the bottom as water.

To attain this the arrangement according to the invention is such that in front of the lens and between the lens and the film strip adjustable color filters are arranged of which at least the filters to be arranged between lens and film strip, consist of several, differently colored parts.

The color filters to be arranged between lens and film strip serve as color transmitters for the individual portions of the picture, whereas the other filters are used for color mixing in order to mutually tone down the color shades produced by the color transmitters.

The combination of filters as color transmitters on the one side and of filters as color mixers on the other side of the lens presents the further advantage that the color effect of the colors passed through the lens is intensified and that the shading can be actually adapted to the total character of the projected image. The boundary lines of the filters of the two groups are copied with different sharpness as they occupy different positions relative to the lens. By a corresponding shading even a plastic picture effect can be obtained to a certain degree.

The color filters serving as color producers and color mixers consist of thin transparent films of pure cellulose (such as cellulose hydrate foil, viscose foil or the like). This material is thoroughly washed and cleaned by a mixture of water, hydrogen, vinegar and alcohol, then colored and employed as a color filter. Filters thus produced and treated present the advantage that they do not become brittle, offer no obstruction to the passage of light, and no blurring of the color or color effect can occur. Furthermore, the color intimately combines with and is absorbed by the cellulose hydrate foil.

An embodiment of the invention is illustrated, by way of example, in the accompanying drawings in which—

Fig. 1 shows in side elevation a film projecting apparatus fitted with the arrangement according to the invention.

Fig. 2 is a front view of a detail on larger scale.

Fig. 3 is a side elevation constituting the insertion of the elements on a larger scale.

Fig. 4 shows in elevation a color mixer according to the invention.

Fig. 5 is a top plan view of Fig. 4.

Fig. 6 is a front view of a color mixer.

Fig. 7 is a top plan view of Fig. 6.

Above lens 1 a shaft 2 is mounted from which a color projector comprising a rotatable disc 4 with color filters 5, 6 and 7 extends downward between the lens 1 and the film 3, the rotatable disc 4 serving as holder and carrier of these color filters. The discs 5, 6, 7 constructed as color filters are also rotatable and adjustable about their axes. These transparent, colored discs 5, 6, 7 serving as filters can, as shown in Fig. 2, be carried out with a large variety of gradings and if necessary combined color tones. The individual sections 8 (Fig. 2) each represents actually a different color mixture or another shade. The disc 4 is rotatably mounted in such a manner that actually one or other of the filter discs 5, 6, 7 made of cellulose can be turned with one or several color shades in front of the illuminated image to enable the introduced color filter to then be adapted to the actual composition of the picture by turning this filter alone. The adjustable discs 5, 6, 7 may be of any desired shape. To enable them to be turned these discs are mounted in toothed rims 13 in mesh with toothed wheels 14 and 15. The wheels 15 are actuated by hand or by a motor for effecting the turning of the color filters 5, 6, 7. The disc 4 is mounted in a guide holder 18 on the end of which a joint 16 is provided. This joint serves for swinging about the shaft 2 the guide holder 18 with disc 4 carrying the filters 5, 6, 7 out of and back into its operative position. The toothed wheels 15 are situated on the outer edge of the disc 4 so that, when rotated, the plates 5, 6 and 7 are also rotated irrespective of which filter is in operative position.

On openings which must be provided in disc 4 for the insertion of the color discs 5, 6, 7 ring discs 33, one for each color disc 5, 6, 7 are fixed and are of slightly smaller diameter than the openings in disc 4, so that ring discs 34 can be loosely mounted on the inner edge of the ring discs 33 and the toothed rims 13 can be mounted on these ring discs 34 to project from the front side of disc 4 and to mesh with the toothed wheels 14, 15. These toothed rims are secured in this position by suitably shaped plates 35 fixed on discs 4. The color filter discs 5, 6, 7 are fixed on the toothed rims in any suitable known manner.

The filters 11 situated in front of the lens and serving as color mixers are also of different transparent colors and preferably of a plurality of colors. These filters are of sector shape. The holders 23 which each carry two segment shaped discs 11 are each provided with a handle 9 and can easily be swung into and out of the operative position about a shaft 25. The spokes 17 of the holders 23 are of transparent material. The main feature is that the color filters 11 are arranged in the holder 23 between the spokes 17 in such a way that between every two color filters 11 an open gap 21 is formed.

The individual filters are made in different color shades. The remaining gap 21 affords an opportunity of seeing whether the color filters engaged from different sides are properly adjusted. The upper end 22 of the lever 9 is bent over and provided with a colored mark corresponding to that of the filter 11. The frame-shaped holders 23 preferably each carry two filter discs 11. The shaft 25 carrying the holders 23 is mounted in a box-shaped housing 26 the outer edge of which has a slot-like aperture 27 for the passage and movement of the levers 9 connected with the holders 23, which aperture extends about half way around the periphery of the housing. The side walls 30 of the housing 26 have each an aperture 28. The housing 26 is fixed on a guide rod 29 the end of which carries a joint similar to the joint 16 (Fig. 4) by means of which it is also mounted on the shaft 2.

The whole arrangement might also be mounted on a separate stand instead of on the shaft 2. In order to obtain narrowly confined momentum effects small miniature filters 31 may additionally be introduced into the light beam. These filters 31 should be considerably smaller than the diameter of the lens. The filters 31 are fixed on very thin rods 32 which are oscillatably mounted in a frame or in a casing 33.

I claim:

1. A device for obtaining colored projections of colorless positive films, comprising a projector having two series of colored filters, one of said series being arranged in front of and the other at the back of the lens of the projector and means for interposing said filters in the path of the light including a filter carrier wherein each filter is carried on a circular ring disc which is rotatably supported on a rotatable main carrier disc, the ring discs being interconnected by means of gears for simultaneous rotary adjustment.

2. A device for obtaining colored projections of colorless positive films, comprising a projector having two series of colored filters, one of said series being arranged in front of and the other at the back of the lens of the projector and means for interposing said filters in the path of the light including a filter carrier wherein each filter is carried on a ring disc which is rotatably supported on a rotatable main carrier disc, the ring discs being interconnected by gears and adapted to be actuated by pinions which are accessible at the edge of the disc for adjusting the filters.

HEINRICH BRESSER.